(12) United States Patent
Desai et al.

(10) Patent No.: US 6,944,847 B2
(45) Date of Patent: Sep. 13, 2005

(54) VIRTUALIZATION OF INPUT/OUTPUT DEVICES IN A LOGICALLY PARTITIONED DATA PROCESSING SYSTEM

(75) Inventors: Prakash Vinodrai Desai, Round Rock, TX (US); Gordon D. McIntosh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/138,896

(22) Filed: May 2, 2002

(65) Prior Publication Data

US 2003/0208642 A1 Nov. 6, 2003

(51) Int. Cl.[7] .............................................. G06F 9/44
(52) U.S. Cl. ..................................... 717/121; 709/226
(58) Field of Search ................................ 717/100–103, 717/120–127; 709/223–226, 104; 710/5–7; 714/56

(56) References Cited

U.S. PATENT DOCUMENTS 5,394,554 A * 2/1995 Elko et al. .................. 709/224
5,655,076 A * 8/1997 Kimura et al. ................ 714/56
6,112,263 A * 8/2000 Futral .......................... 710/37

OTHER PUBLICATIONS

Schimunek et al., "Slicing the AS/400 with Logical Partitioning: A How to Guide", IBM RedBooks, http://www.redbooks.ibm.com, pp.: i–xviii, 1–219, Aug. 1999.*

* cited by examiner

Primary Examiner—Ted T. Vo
(74) Attorney, Agent, or Firm—Mark E. McBurney; Dillon & Yudell LLP

(57) ABSTRACT

A hypervisor (management) layer synchronizes use of virtualized input/output (I/O) devices that may regularly be used by multiple partitions of a logically partitioned data processing system by making them callable by any system partition to the hypervisor layer. A partition makes a call to the hypervisor to reserve an I/O resource. If the I/O resource is presently allocated to another partition when a call is made to reserve the resource, the hypervisor rejects the request to reserve the device. If the resource is available, the hypervisor issues a command to the resource to service calls made from the reserving partition. After utilizing the resource as necessary, the reserving partition releases control over the I/O device and sends a notification to hypervisor that it has released the I/O device. Upon release, the I/O device will automatically be available for use by another partition via a call to the hypervisor.

12 Claims, 4 Drawing Sheets

VIRTUALIZATION OF INPUT/OUTPUT DEVICES IN A LOGICALLY PARTITIONED DATA PROCESSING SYSTEM

BACKGROUND OF THE INVENTION

1. Technical Field

The present invention relates generally to the field of computer architecture and, more specifically, to methods and systems for managing resources among multiple operating system images within a logically partitioned data processing system.

2. Description of the Related Art

Logical partitions, or LPARs, provide the capability to partition a single server into two or more virtual servers, with each LPAR able to run multiple applications or workloads. Each LPAR acts as an independent virtual server, with its own memory, using shared processors and disks—all within a single symmetric multiprocessing (SMP) system. LPARs can be individually managed and customized for performance, allowing a single system to be fully optimized for interactive, e-business, business intelligence or other workloads. Each partition can be set independently, permitting different system names, languages and time zones.

A logical partition consists of CPUs, memory, and I/O slots and their attached devices that are typically a subset of a pool of available resources within a system. LPAR differs from Physical Partitioning (PPAR) in the way resources are grouped to form a partition. Logical partitions do not need to conform to the physical boundaries of the building blocks (collection of resources) used to build the server. Instead of grouping by physical building blocks, LPAR adds more flexibility and freedom to select components from the entire pool of available system resources. This allows better granularity, which maximizes the resource usage on the system and minimizes unnecessary resource reallocation.

A logical partitioning functionality within a data processing system (platform) allows multiple copies of a single operating system (OS) or multiple heterogeneous operating systems to be simultaneously run on the single data processing system platform. Each logical partition runs its own copy of the operating system and is isolated from any activity in other partitions. Software failures do not propagate through the system, and the hardware facilities and microcode provide strong isolation between resources. Many types of errors, even those within shared resources, are isolated inside the partition where they occur.

LPAR works within a single memory coherence domain so it can be used within a simple SMP with no special building block structure. All the operating system images run within the same memory map, but are protected from each other by special address access control mechanisms in the hardware, and special firmware added to support the operating system. Thus, software errors in the control of an OS's allocated resources are prevented from affecting the resources of any other image.

A logical partition, within which an operating system image runs, is assigned a non-overlapping sub-set of the platform's resources. Each image of the OS (or each different OS) directly controls a distinct set of allocable resources within the platform and ensure that the various images cannot control any resources that have not been allocated to them. These platform allocable resources include one or more architecturally distinct processors with their interrupt management area, regions of system memory, and I/O adapter bus slots. The partition's resources are represented by the platform's firmware to the OS image.

A problem with standard LPAR computer systems is that the input/output (I/O) sub-systems are designed with several I/O adapters (IOAs) sharing a single I/O bus. An OS image in a particular partition contains device drivers that issue commands that directly control its own IOA. The system user must attach the I/O resources to the partition in order for the partition to own these resources. In the case of the floppy drive, CD ROM drive and other low read/write rate devices, this methodology makes the use of these devices cumbersome. These devices are not high performance by nature so having a direct path to the device from the OS does not significantly increase performance. It would, therefore, be advantageous to devise a method, system and apparatus that reduces the complexity of attaching and re-attaching an I/O device to different partitions as its resource is needed.

SUMMARY OF THE INVENTION

In accordance with a preferred embodiment, a method, system and program product of allocating an input/output adapter to a logical partition within a logically partitioned data processing system is provided. The method comprises receiving a request from an operating system image assigned to the logical partition to be allocated the input/output adapter; allocating the input/output adapter to the logical partition, in response to the request, such that the input/output adapter executes commands received from the logical partition; and releasing the allocation of the input/output adapter to the logical partition such that the input/output adapter no longer executes commands received from the logical partition.

The logically partitioned data processing system comprises a plurality of logical partitions; a plurality of operating systems, each assigned to one of said plurality of logical partitions; a plurality of input/output adapters, each capable of being allocated to any one of said plurality of logical partitions, wherein an input/output adapter executes commands received from a logical partition to which it has been allocated; and a management layer that allocates an input/output adapter of the plurality of input/output adapters to a logical partition of the plurality of logical partitions when a request is received from the operating system assigned to the logical partition, and wherein, upon completion of the logical partition's utilization of the input/output adapter for a current allocation, the logical partition releases the input/output adapter to the management layer such that it becomes available for allocation to a logical partition of the plurality of logical partitions.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
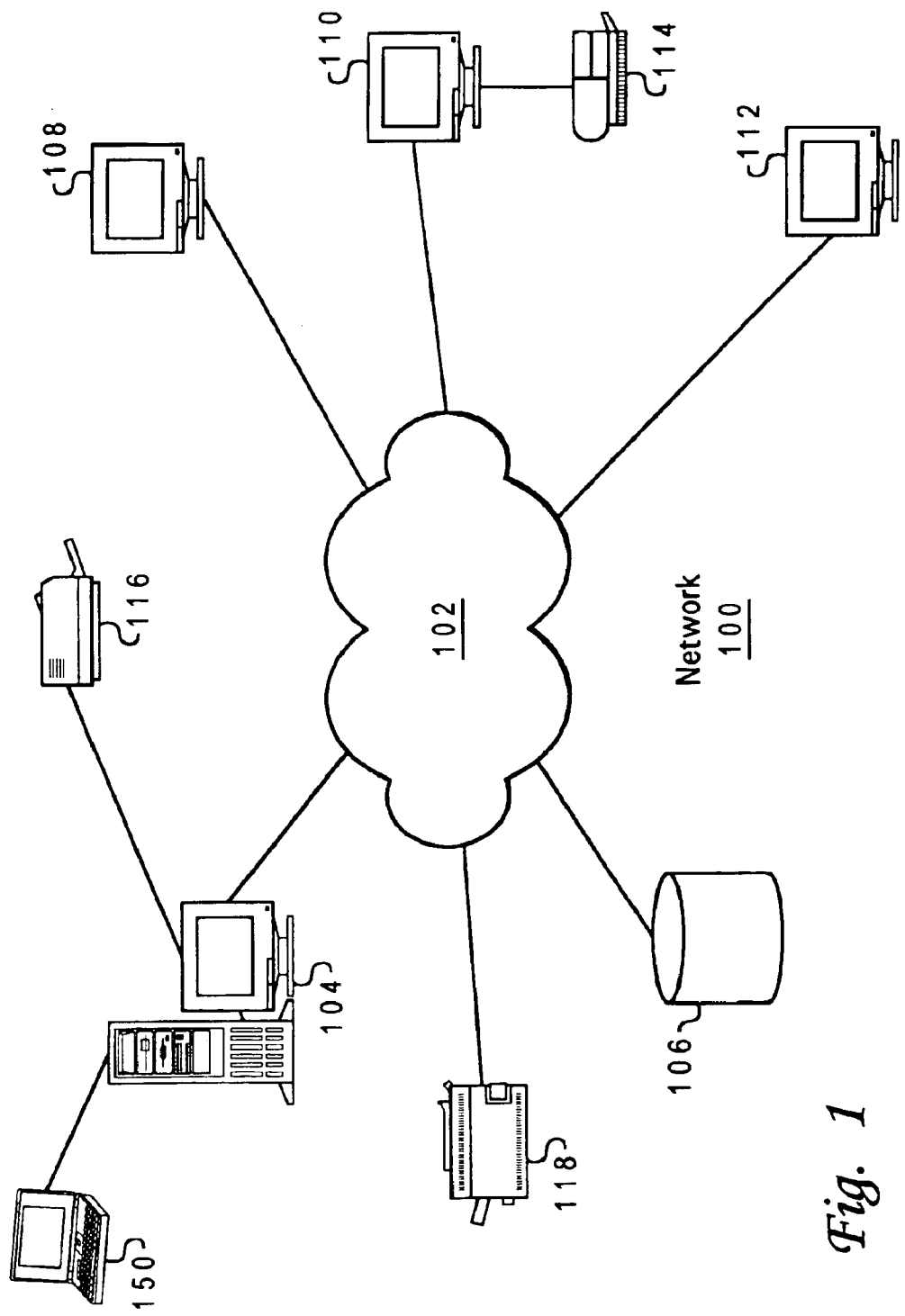
FIG. 1 depicts a pictorial representation of a distributed data processing system in which the present invention may be implemented in accordance with a preferred embodiment of the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104 as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
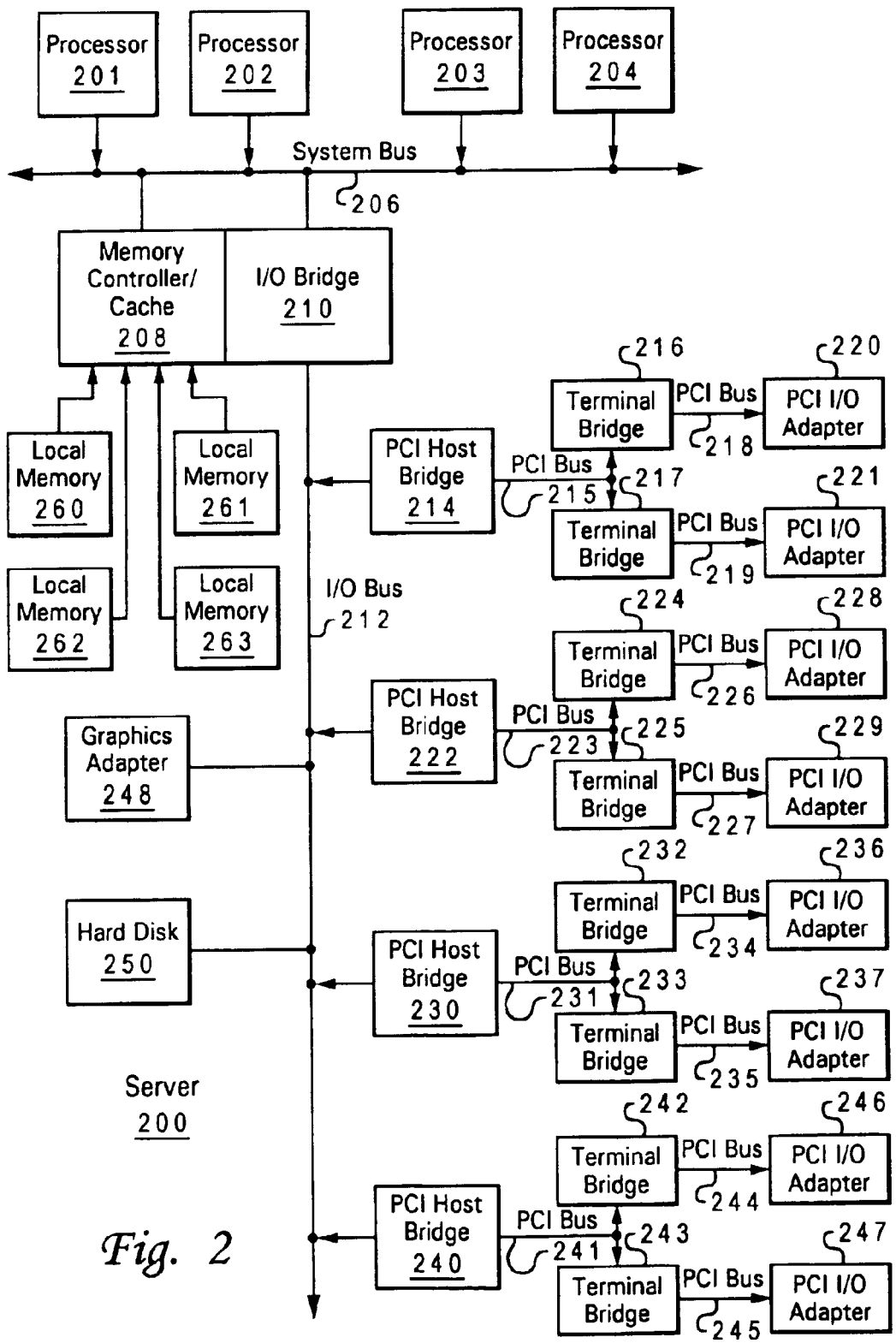
FIG. 2 depicts a block diagram of a data processing system, which may be implemented as a logically partitioned server, in accordance with the present invention, in accordance with a preferred embodiment of the present invention.

With now reference to FIG. 2, a block diagram of a data processing system, which may be implemented as a logically partitioned server, such as server 104 in FIG. 1, is depicted in accordance with the present invention. Data processing system 200 may be a symmetric multiprocessor (SMP) system including a plurality of processors 201, 202, 203, and 204 connected to system bus 206. For example, data processing system 200 may be an IBM RS/6000, a product of International Business Machines Corporation in Armonk, N.Y. Alternatively, a single processor system may be employed. Also connected to system bus 206 is memory controller/cache 208, which provides an interface to a plurality of local memories 260–363. I/O bus bridge 210 is connected to system bus 206 and provides an interface to I/O bus 212. Memory controller/cache 208 and I/O bus bridge 210 may be integrated as depicted.

Data processing system 200 is a logically partitioned data processing system. Thus, data processing system 200 may have multiple heterogeneous operating systems (or multiple instances of a single operating system) running simultaneously. Each of these multiple operating systems may have any number of software programs executing within it. Data processing system 200 is logically partitioned such that different I/O adapters 220–321, 228–329, 236–337, and 246–347 may be allocated to different logical partitions, but do not need to be assigned to any individual partition.

In accordance with the preferred embodiment, devices that may regularly be used by multiple partitions, either for maintenance, updates, or other system administration functions are virtualized as callable by any partition to the Hypervisor (management) layer. This will allow any partition to use the I/O resource without the necessity of removal from the I/O list of another partition first. This also eliminates the need for each OS to have a separate device driver for these devices.

Thus, for example, suppose data processing system 200 is divided into three logical partitions, P1, P2, and P3. Each of processors 201–204, and each of local memories 260–264 is assigned to one of the three partitions. However, each of I/O adapters 220–221, 228–229, and 236–237 would remain unassigned.

Each operating system executing within data processing system 200 is assigned to a different logical partition. In the prior art, each operating system executing within a data processing system would only be able to access those I/O units that are within its logical partition. In the preferred embodiment of the present invention, the I/O units remain freely allocatable to any requesting partition.

Peripheral component interconnect (PCI) Host Bridge 214 connected to I/O bus 212 provides an interface to PCI local bus 215. A number of Terminal Bridges 216–317 may be connected to PCI bus 215. Typical PCI bus implementations will support four to ten Terminal Bridges for providing expansion slots or add-in connectors. Each of Terminal Bridges 216–317 is connected to a PCI/I/O Adapter 220–321 through a PCI Bus 218–319. Each I/O Adapter 220–321 provides an interface between data processing system 200 and input/output devices such as, for example, other network computers, which are clients to server 200. In one embodiment, only a single I/O adapter 220–321 may be connected to each Terminal Bridge 216–317. Each of Terminal Bridges 216–317 is configured to prevent the propagation of errors up into the PCI Host Bridge 214 and into higher levels of data processing system 200.

Additional PCI Host Bridges 222, 230, and 240 provide interfaces for additional PCI buses 223, 231, and 241. Each of additional PCI buses 223, 231, and 241 are connected to a plurality of Terminal Bridges 224–325, 232–333, and 242–343 which are each connected to a PCI I/O adapter 228–329, 236–337, and 246–347 by a PCI bus 226–327, 234–335, and 244–345. Thus, additional I/O devices, such as, for example, modems or network adapters may be supported through each of PCI I/O adapters 228–229, 236–237, and 246–247. In this manner, server 200 allows connections to multiple network computers. A memory mapped graphics adapter 248 and hard disk 250 may also be connected to I/O bus 212 as depicted, either directly or indirectly. Hard disk 250 may be logically partitioned between various partitions without the need for additional hard disks. However, additional hard disks may be utilized if desired.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
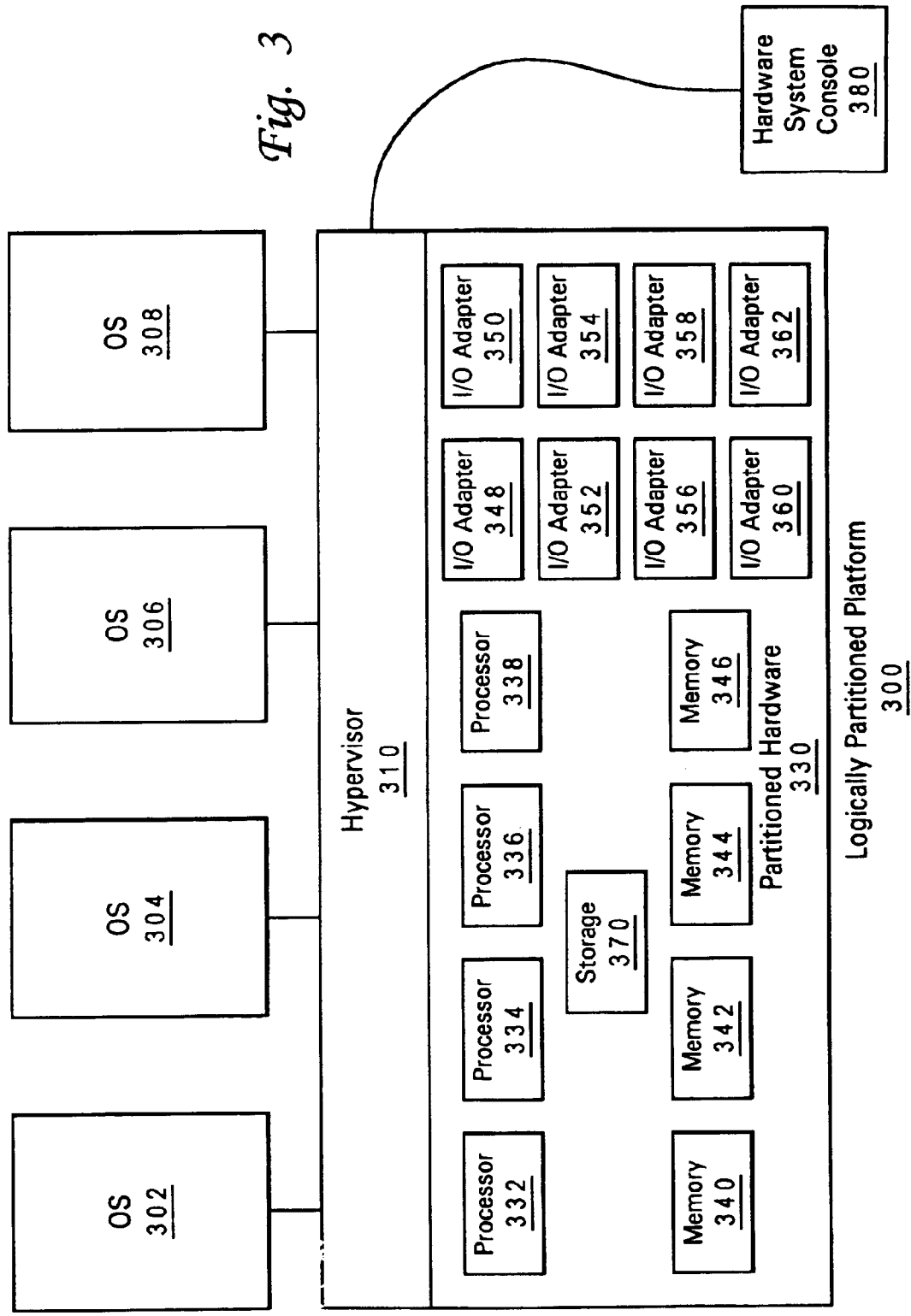
FIG. 3 depicts a block diagram of an exemplary logically partitioned platform in which the present invention may be implemented, in accordance with the preferred embodiment of the present invention.

With reference now to FIG. 3, a block diagram of an exemplary logically partitioned platform is depicted in which the present invention may be implemented. The hardware in logically partitioned platform 300 may be implemented as, for example, server 200 in FIG. 2. Logically partitioned platform 300 includes partitioned hardware 330, hypervisor 310, and operating systems 302–408. Operating systems 302–408 may be multiple copies of a single operating system or multiple heterogeneous operating systems simultaneously run on platform 300.

Partitioned hardware 330 includes a plurality of processors 332–338, a plurality of system memory units 340–346, a plurality of Input/output (I/O) adapters 348–362, and a storage unit 370. Each of the processors 342–348, memory units 340–346, and I/O adapters 348–362 may be assigned to one of multiple partitions within logically partitioned platform 300, each of which corresponds to one of operating systems 302–308.

Hypervisor 310, implemented as firmware, creates and enforces the partitioning of logically partitioned platform 300. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

The hypervisor layer 310 synchronizes use of the IOAs 348–362 between the partitions of the logically partitioned platform 300. When one of OS images 302–308 wants to utilize an I/O resource, it makes a call to the hypervisor 310 to reserve the IOA, including parameters indicating the IOA. The hypervisor 310 checks whether the IOA is available. If available, the hypervisor 310 issues a command to the resource, such as IOAs 348–362, that it service calls made from the reserving OS image (and its corresponding partition). After obtaining control over the I/O device via IOAs 348–362, the reserving OS utilizes the resource as necessary. When done with the resource, the reserving OS releases control over the IOA and sends a notification to hypervisor 310 that it has released the IOA. Upon release, the device will automatically be available for use by another partition via a call to the hypervisor 310. If the I/O resource is presently allocated to another partition when an OS makes a call to reserve the resource, the hypervisor rejects the request.

In the preferred embodiment, I/O devices that may regularly be used by multiple partitions, either for maintenance, updates, or other system administration functions are virtualized as callable by any system partition to the hypervisor 310 (management) layer. As will be appreciated, this provides significant advantages over prior art methods and systems. This method and system allows any partition to use the I/O resource without the necessity of removal from the I/O list of another partition first. This also eliminates the need for each OS to have a separate device driver for these types of devices. Moreover, this method and system eliminates the need for manually assigning an I/O resource to a partition, removing the resource from the partition's I/O list after completing its use, and then re-assigning to the next partition, as was necessary in the prior art. It should be noted that in the case of floppy drives, CD ROM drives and other low read/write rate devices, there is little performance impact from eliminating the prior-art's direct path to the device from the OS.

Those of ordinary skill in the art will appreciate that the hardware and software depicted in FIG. 3 may vary. For example, more or fewer processors and/or more or fewer operating system images may be used than those depicted in FIG. 3. The depicted example is not meant to imply architectural limitations with respect to the present invention.

Figure 4:
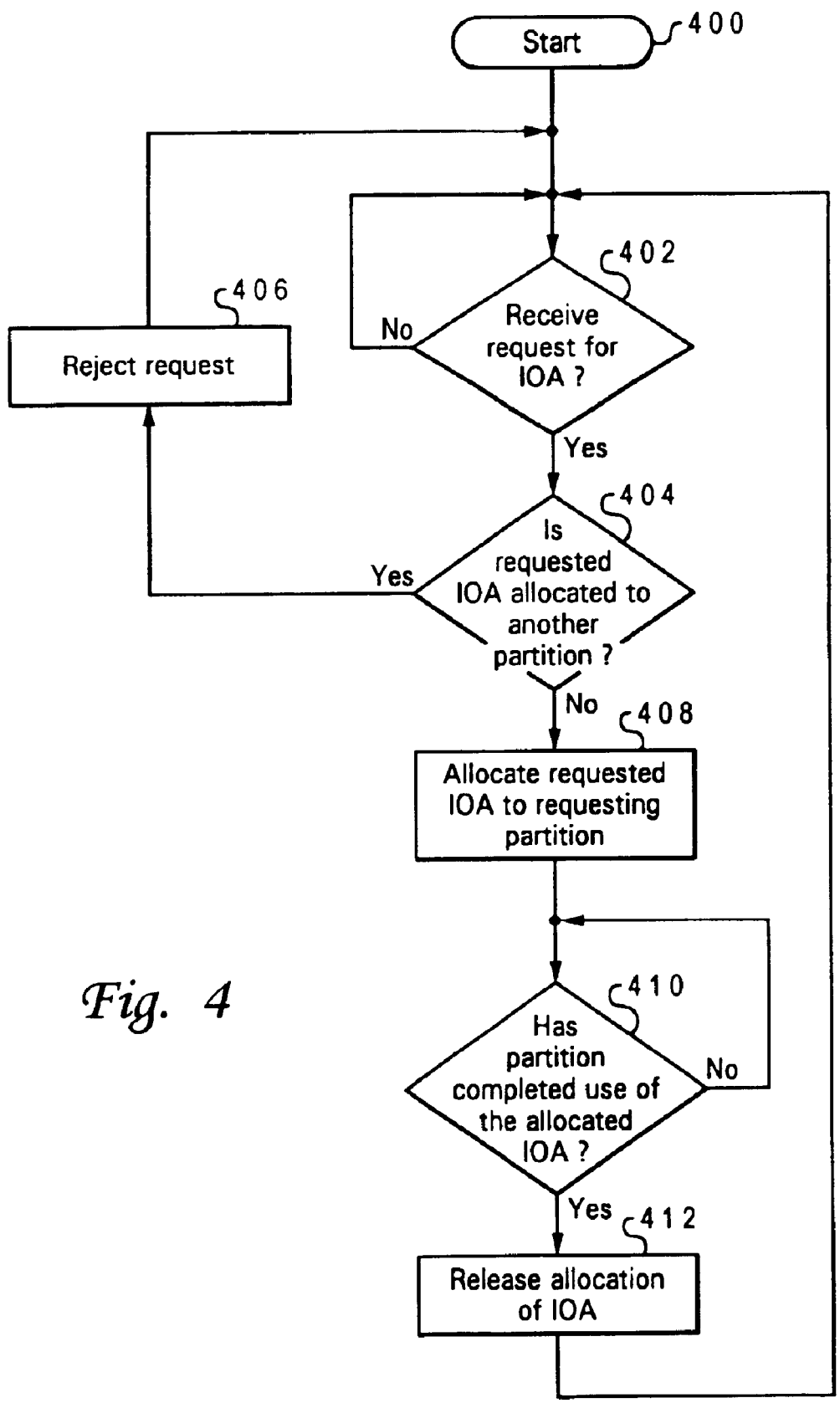
FIG. 4 illustrates a flowchart an exemplary process for allocating an input/output adapter to a logical partition within a logical partition data processing system, in accordance with the preferred embodiment of the present invention.

With reference now to FIG. 4, a flowchart illustrating an exemplary process for allocating an input/output adapter to a logical partition within a logically partitioned data processing system is depicted, in accordance with the preferred embodiment of the present invention. When the logically partitioned platform, such as platform 300 in FIG. 3, is initialized, the hypervisor begins accepting requests for I/O resources from system partitions. As seen in FIG. 4, this process starts at step 400, and proceeds to decision block 402, where a determination is made whether a request for an IOA has been received. This step is repeated until a request for an IOA is received and the process passes to a decision block 404.

Decision block 404 makes a determination whether the requested IOA has been previously allocated to another partition within the logically partitioned data processing system. If so, the process proceeds to step 406, where the request for an IOA is rejected, and the process returns to decision block 402. When the requesting partition receives the rejection, it may again request the IOA and enter the process at decision block 402.

Returning to decision block 404, if the requested IOA has not been previously allocated, the process proceeds to step 408, where the requested IOA is allocated to the requesting partition. Thereupon, the requesting partition takes control of the I/O device and then is capable of proceeding to perform its desired functions with the I/O resource. Thereafter, the process proceeds to decision block 410, where the process waits for the partition to complete its use of the allocated IOA. When a determination is made at step 410 that the partition has completed its use of the IOA, the process proceeds to step 412, where the allocation of the IOA to the partition is released. In a preferred embodiment, the partition would release the IOA upon completion of its utilization of the resource, and then it would notify the hypervisor that the resource is now available for re-allocation to another partition. The process then returns to decision block 402, where the hypervisor awaits receipt of a new request for control of the IOA.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims. Also, while the present invention has been described in the context of a fully functioning data processing system, those skilled in the art will appreciate that the processes of the present invention are capable of being distributed in the form of a computer readable medium of instructions and a variety of forms and that the present invention applies equally regardless of the particular type of signal-bearing media actually used to carry out the distribution. Examples of computer-readable media include recordable-type media such a floppy disc, a hard disk drive, a RAM, and CD-ROMs and transmission-type media such as digital and analog communications links.

What is claimed is:

1. A method of allocating an input/output adapter to a logical partition within a logically partitioned data processing system, the method comprising the steps of:

receiving a request from an operating system image assigned to the logical partition to be allocated the input/output adapter;

allocating the input/output adapter to the logical partition, in response to the request, such that the input/output adapter executes commands received from the logical partition; and releasing the allocation of the input/output adapter to the logical partition such that the input/output adapter no longer executes commands received from the logical partition.

2. The method of claim 1, wherein the steps of allocating and releasing are performed only if the input/output adapter is not allocated to another logical partition.

3. The method of claim 1, wherein the input/output adapter provides connectivity between a CD ROM drive and the logically partitioned data processing system.

4. The method of claim 1, wherein the input/output adapter is not assigned to a partition of the plurality of partitions.

5. A computer program product for use in a data processing system for allocating an input/output adapter to a logical partition within a logically partitioned data processing system, the computer program product comprising:

a storage medium; and program instructions stored on said storage medium for (a) receiving a request from an operating system image assigned to the logical partition to be allocated the input/output adapter, (b) allocating the input/output adapter to the logical partition, in response to the request, such that the input/output adapter executes commands received from the logical partition; and (c) releasing the allocation of the input/output adapter to the logical partition such that the input/output adapter no longer executes commands received from the logical partition.

6. The computer program product of claim 5, wherein (b) and (c) are performed only if the input/output adapter is not allocated to another logical partition.

7. The computer program product of claim 5, wherein the input/output adapter provides connectivity between a CD ROM drive and the logically partitioned data processing system.

8. The computer program product of claim 5, wherein the input/output adapter is not assigned to a partition of the plurality of partitions.

9. A logically partitioned data processing system, comprising:

a plurality of logical partitions;

a plurality of operating systems, each assigned to one of said plurality of logical partitions;

a plurality of input/output adapters, each capable of being allocated to any one of said plurality of logical partitions, wherein an input/output adapter executes commands received from a logical partition to which it has been allocated; and a management layer that allocates an input/output adapter of the plurality of input/output adapters to a logical partition of the plurality of logical partitions when a request is received from the operating system assigned to the logical partition, and wherein, upon completion of the logical partition's utilization of the input/output adapter for a current allocation, the logical partition releases the input/output adapter to the management layer such that it becomes available for allocation to a logical partition of the plurality of logical partitions.

10. The system of claim 9, wherein the management layer will only allocate an input/output adapter if it is not currently allocated.

11. The system of claim 9, wherein the operating system releasing the input/output adapter sends a release notification to the management layer.

12. The system of claim 9, wherein at least one of the input/output adapters of the plurality of input/output adapters provides connectivity between a CD ROM drive and the logically partitioned data processing system.

* * * * *